United States Patent
Chang et al.

(10) Patent No.: US 8,004,963 B2
(45) Date of Patent: Aug. 23, 2011

(54) APPARATUS AND METHOD FOR PACKET REDUNDANCY AND RECOVERY

(75) Inventors: Rong-Wen Chang, Fremont, CA (US); John K. Lee, Fremont, CA (US); Ron Lin, Fremont, CA (US)

(73) Assignee: Audividi Inc., George Town (KY)

( * ) Notice: Subject to any disclaimer, the term of this patent is extended or adjusted under 35 U.S.C. 154(b) by 129 days.

(21) Appl. No.: 12/390,574

(22) Filed: Feb. 23, 2009

(65) Prior Publication Data

US 2009/0213728 A1 Aug. 27, 2009

Related U.S. Application Data

(60) Provisional application No. 61/031,734, filed on Feb. 27, 2008.

(51) Int. Cl.
G06F 11/00 (2006.01)
H03M 13/03 (2006.01)

(52) U.S. Cl. ......... 370/216; 714/751; 714/758; 714/801

(58) Field of Classification Search .................. 370/216, 370/394, 252, 474; 714/776, 747, 748, 751–752, 714/758, 764, 784, 801
See application file for complete search history.

(56) References Cited

U.S. PATENT DOCUMENTS

| | | | |
|---|---|---|---|
| 6,000,053 A * | 12/1999 | Levine et al. | 714/766 |
| 6,851,084 B2 * | 2/2005 | Pattavina | 714/776 |
| 6,895,019 B2 * | 5/2005 | Gibson et al. | 370/473 |
| 7,409,627 B2 * | 8/2008 | Kim et al. | 714/776 |
| 2005/0111371 A1 * | 5/2005 | Miura et al. | 370/242 |
| 2005/0166123 A1 * | 7/2005 | Yanamoto et al. | 714/776 |
| 2006/0029065 A1 * | 2/2006 | Fellman | 370/389 |
| 2007/0165673 A1 * | 7/2007 | Huang | 370/474 |
| 2007/0300123 A1 * | 12/2007 | Li | 714/755 |
| 2007/0300127 A1 * | 12/2007 | Watson et al. | 714/758 |
| 2008/0189587 A1 * | 8/2008 | Takaku | 714/748 |
| 2009/0055708 A1 * | 2/2009 | Chang et al. | 714/758 |
| 2009/0116561 A1 * | 5/2009 | Park et al. | 375/240.25 |
| 2009/0319845 A1 * | 12/2009 | Liu et al. | 714/747 |
| 2009/0327842 A1 * | 12/2009 | Liu et al. | 714/776 |

* cited by examiner

*Primary Examiner* — Kwang B Yao
*Assistant Examiner* — Candal Elpenord
(74) *Attorney, Agent, or Firm* — Thomas|Kayden

(57) ABSTRACT

Apparatus and method for packet redundancy and recovery are disclosed. In a transmitter, parity packets are generated by executing exclusive OR between the corresponding data packets, and are transmitted along with the data packets to a receiver. In the receiver, lost data packets are found out and are recovered by executing exclusive OR between the corresponding data packets and the corresponding parity packets. This invention enhances the reliability of streaming data transmission using loss-recovery packets. Data packets are grouped and transmitted with redundant packets to allow the receiver to recover a lost packet within the group. This will minimize the need and therefore the time and delay to request a retransmission of the damaged or lost packets.

25 Claims, 6 Drawing Sheets

APPARATUS AND METHOD FOR PACKET REDUNDANCY AND RECOVERY

CROSS REFERENCE TO RELATED APPLICATIONS

This application claims the benefit of U.S. Provisional Application No. 61/031734, filed Feb. 27, 2008.

BACKGROUND OF THE INVENTION

1. Field of the Invention

The present invention relates to the field of communication, and more particularly to a packet redundancy and recovery method for packet transmission.

2. Description of the Related Art

Real-time multi-media communication is typical UDP protocol based to avoid the un-expected timeout for TCP protocol. Typically, the packet loss is considered part of the channel characteristics and no try is made to recover the loss. A control channel may be used to feedback the packet loss information, so the sender will throttle the speed of sending to better match the effective end-to-end bandwidth. Some system may use multiple routes to send multiple copies of the data to achieve high quality. But nothing is done in a route to reduce the packet loss at the application level.

In the real-time audio and video communication over Internet, a lost packet represents only 30-60 milliseconds or so of length of time and is undetectable to our perception. A timeout for re-transmission will cause data to stop for 10 to 20 times of that length of time and is annoying. The current approach is to control the speed of sending to match the available bandwidth to reduce the amount of packet loss. For a network with high data loss rate, the effective bandwidth may become so low that real communication becomes impossible.

The traditional way to implement reliable transmission of data on an unreliable packet communication channel is to use acknowledgement, time out and re-transmission. Both ends have to wait for the time-out before a re-transmission can take place, and the time-out usually has to be longer than the round-trip time. Sufficiently long time out has to be used in a wide area network, and this has contributed to the low performance in using lossy network connections to transmit streaming data reliably.

BRIEF SUMMARY OF THE INVENTION

Various embodiments are presented of a method and an apparatus for packet loss management.

A communication transmitter capable of generating redundant packets is disclosed. The communication transmitter comprises a receiving interface for receiving data, a media capture for capturing media data, a media encoder for encoding the media data, a packet generation module, a parity generator and a transmitting interface. The packet generation module coupled to the media encoder is configured to generate a plurality of data packets by the media data, and then send the plurality of data packets to the parity generator. The parity generator is configured to generate a plurality of parity packets by executing exclusive OR between the corresponding plurality of data packets, wherein the corresponding plurality of data packets are selected in an interleaved order. Then, the parity generator sends the plurality of parity packets along with the corresponding plurality of data packets to a communication receiver in a remote system over the network via the transmitting interface.

A communication receiver capable of recovery loss packets is disclosed. The communication receiver comprises a receiving interface, a recovery module, a buffer, a packet processor, a media decoder and a display interface. The receiving interface is configured to receive a plurality of data packets with sequence number and a plurality of parity packets generated by executing exclusive OR between the corresponding plurality of data packets selected in an interleaved order. The recovery module coupled to the receiving interface is configured to analyze the plurality of data packets to find out the lost data packets by checking the sequence number, and then recover the lost data packets by executing exclusive OR between the corresponding plurality of data packets and the corresponding plurality of parity packets. The packet processor is configured to merge the plurality of recovery data packets and the plurality of data packets. The media decoder coupled to the packet processor is configured to decode the plurality of data packets and the plurality of recovery data packets to media data. The display interface coupled to the media decoder is configured to output the media data to display.

A method for packet redundancy is disclosed. First, media data is captured from the received data and is encoded. Next, a plurality of data packets is generated with sequence numbers by the encoded data. Then, a plurality of parity packets is generated by executing exclusive OR between the corresponding plurality of data packets selected in an interleaved order. Finally, the plurality of parity packets are transmitted along with the corresponding plurality of data packets to the transmitting interface.

A method for packet recovery is disclosed. First, a plurality of data packets with sequence numbers and a plurality of parity data packets are received, wherein the plurality of parity packets are generated by executing exclusive OR between the corresponding plurality of data packets selected in an interleaved order. Next, lost data packets are found out by analyzing the sequence numbers of the plurality of data packets, and are recovered by executing exclusive OR between the corresponding plurality of data packets and the corresponding plurality of parity packets. Then, the plurality of recovery data packets and the plurality of data packets are merged, decoded to media data, and output to display.

BRIEF DESCRIPTION OF THE DRAWINGS

A better understanding of the present invention can be obtained when the following detailed description of the preferred embodiment is considered in conjunction with the following drawings, in which.

Figure 1:
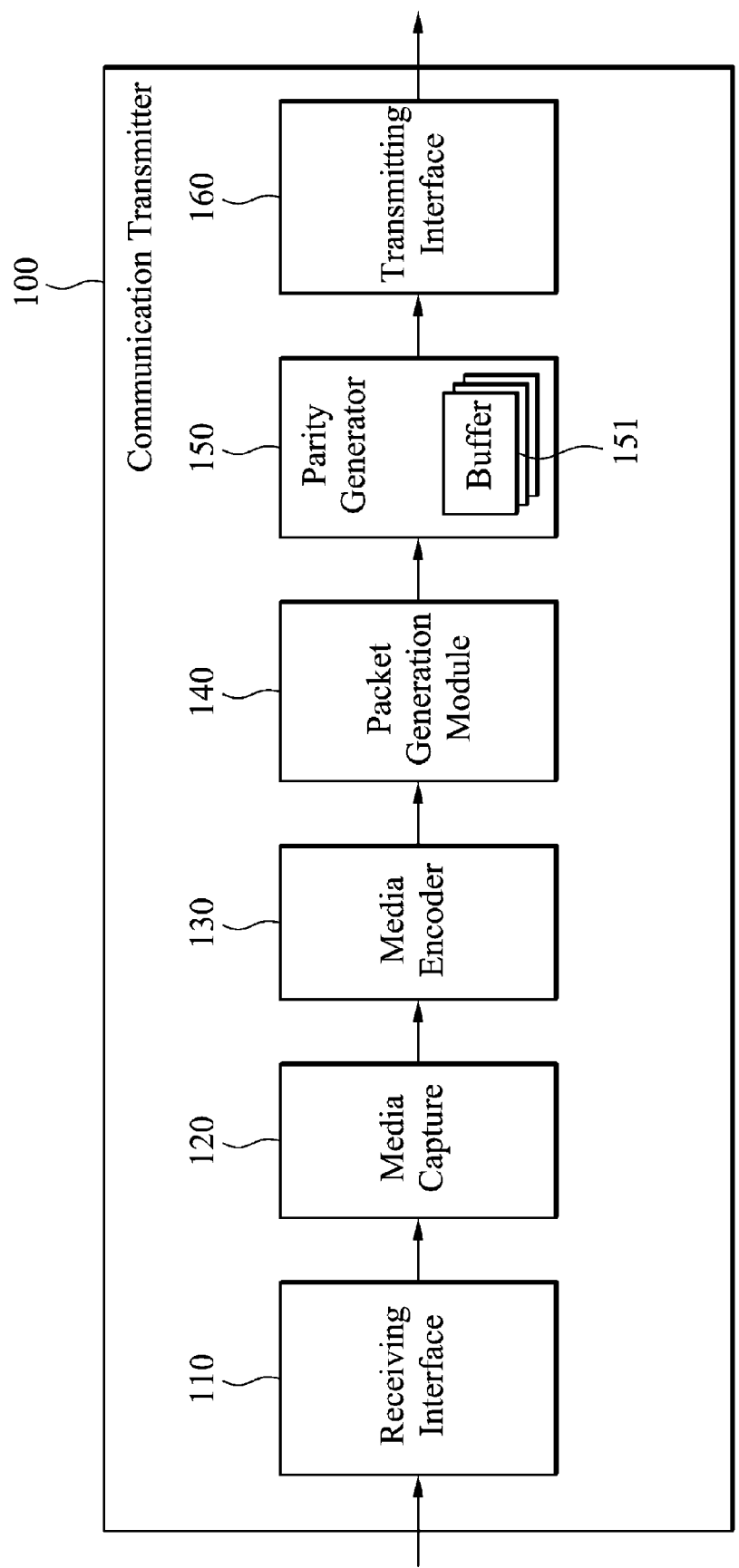
FIG. 1 is a block diagram of an exemplary communication transmitter, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1—Exemplary Communication Transmitter

FIG. 1 illustrates an exemplary communication transmitter 100, according to one embodiment of this invention. The communication transmitter 100 may be any of various transmitters for data communication. Such communication transmitter 100 may be particularly useful for media communication, such as real-time multi-media communication. Thus, the communication transmitter 100 may be any of various transmitters.

As shown, the communication transmitter 100 may comprise a receiving interface 110, a media capture 120, a media encoder 130, a packet generation module 140, a parity generator 150 and a transmitting interface 160. The receiving interface 110 may be configured to receive media data. The media capture 120 coupled to the receiving interface 110 may be configured to capture media data from the receiving interface 110, and then the media encoder 130 coupled to the media capture 120 may encode the media data from the media capture 120. The packet generation module 140 coupled to the media encoder 130 may receive the encoded data from the media encoder 130, and may generate a plurality of data packets by the media data. For example, the plurality of data packets may be generated with header including sequence numbers based on the Real-Time Transport Protocol specifications. Then, the packet generation module 140 may send the plurality of data packets to the parity generator 150.

As shown, the parity generator 150 may comprise a plurality of buffer 151 to store data packets. The parity generator 150 may first select a largest data packet among the plurality of data packets from the packet generation module 140, and may pad the rest data packets of the plurality of data packets with a value (e.g., 0) to the same length of the largest packet. Next, the parity generator 150 may generate a plurality of parity packets by executing exclusive OR between the corresponding plurality of data packets, wherein the corresponding plurality of data packets are selected in an interleaved order. The method for selecting the corresponding plurality of data packets will be described more clearly in FIG. 4. The plurality of data packets and the plurality of parity packets may be stored in the buffer 151. Then, the parity generator 150 may send the plurality of parity packets along with the corresponding plurality of data packets to a communication receiver in a remote system over the network via the transmitting interface 160.

The plurality of parity packets generated by the parity generator 150 may contain header extension utilized to indicate the plurality of data packets used in parity generation. For example, The X bit in the Real-Time Transport Protocol (RTP) packet header (based on RFC1889) is set to 1 to indicate the existence of a header extension. A special "type number" is reserved for the parity packets in the first 16-bit of the header extension (the "Defined by profile" field), so the parity packets can coexist with other types of packets with header extension. Specifying the sequence numbers of the packets in the parity generation in the header extension field allows the parity packet to be received out of order.

Figure 2:
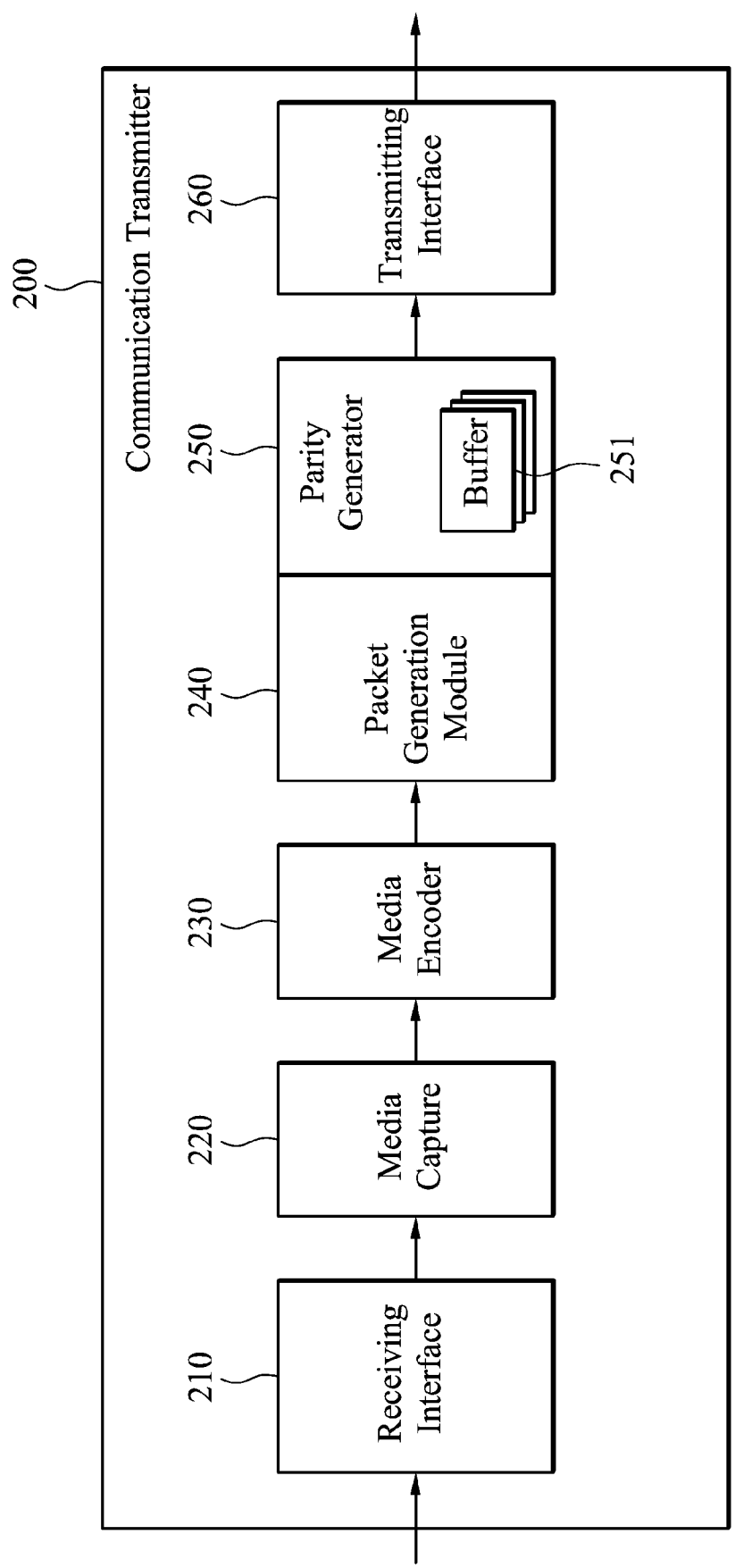
FIG. 2 is a block diagram of an exemplary communication transmitter, according to another embodiment.

FIG. 2—Another Exemplary Communication Transmitter

FIG. 2 illustrates an exemplary communication transmitter 200, according to another embodiment of this invention. As shown, the communication transmitter 200 may comprise a receiving interface 210, a media capture 220, a media encoder 230, a packet generation module 240, a parity generator 250 and a transmitting interface 260. The communication transmitter 200 is very similar to the communication transmitter 100. The only difference between the communication transmitter 100 and the communication transmitter 200 is that the parity generator 250 in the communication transmitter 200 may be integrated into the packet generation module 240, thus the plurality of parity packets may be generated with valid Real-Time Transport Protocol sequence numbers. On the contrary, in the communication transmitter 100, the independent parity generator 150 may be connected to the packet generation module 140, so the packet generation module 140 is not aware of the parity generation. Based on the RFC 1889 RTP protocol specifications, the plurality of parity packets has no valid sequence numbers.

Other portions of the communication transmitter 200 may function as the communication transmitter 100, so the detail descriptions are not repeated here.

Figure 3:
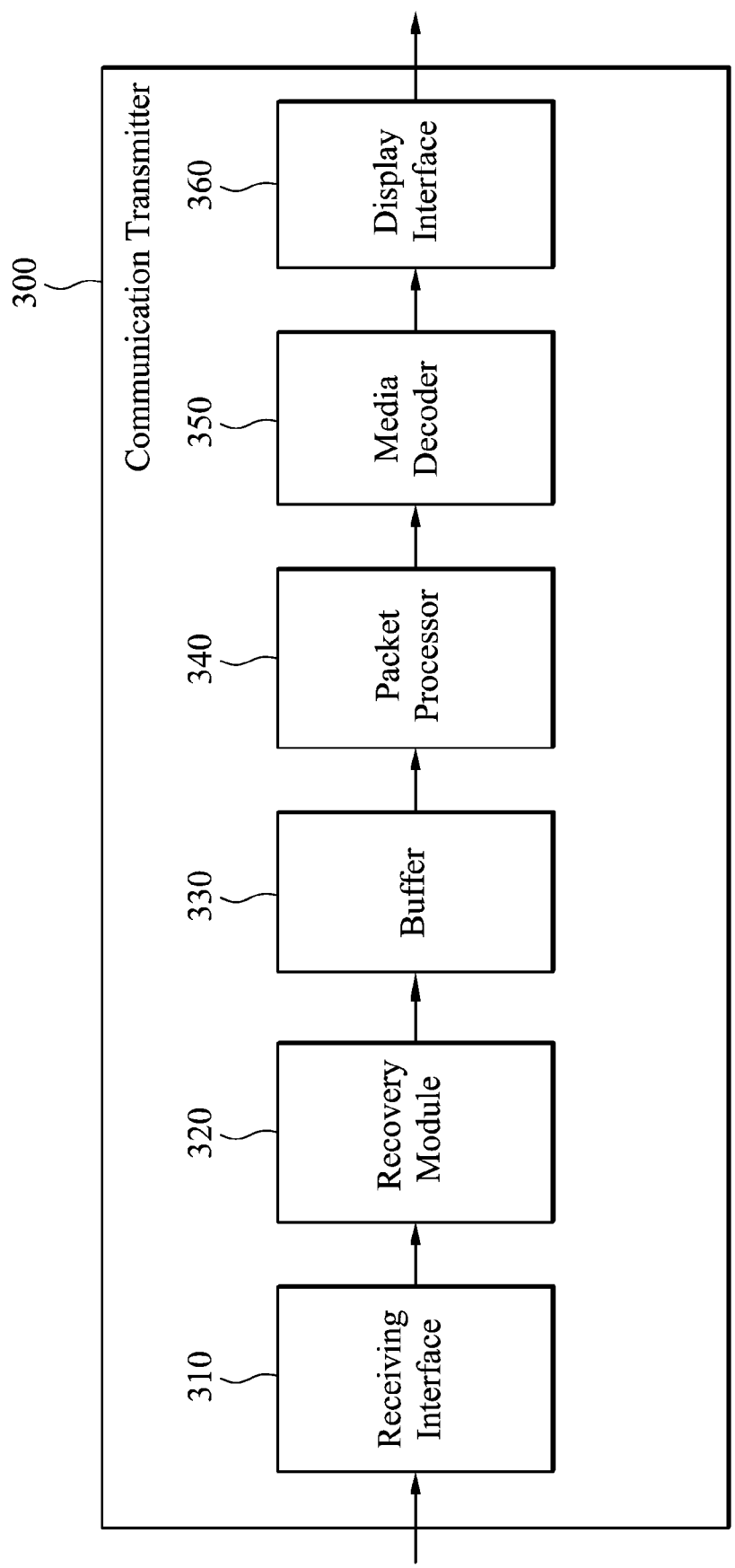
FIG. 3 is a block diagram of an exemplary communication receiver, according to one embodiment.

FIG. 3—Exemplary Communication Receiver

FIG. 3 illustrates an exemplary communication receiver 300, according to one embodiment of this invention. The communication receiver 300 may be any of various receivers for data communication. Such communication receiver 300 may be particularly useful for media communication, such as real-time multi-media communication. Thus, the communication receiver 300 may be any of various receivers.

As shown, the communication receiver 300 may comprise a receiving interface 310, a recovery module 320, a buffer 330, a packet processor 340, a media decoder 350 and a display interface 360. The receiving interface 310 may be configured to receive a plurality of data packets and a plurality of parity packets, wherein the plurality of data packets may be generated with header including sequence numbers based on the Real-Time Transport Protocol specifications, and the plurality of parity packets may be generated by executing exclusive OR between the corresponding plurality of data packets selected in an interleaved order. The plurality of parity packets may be contain header extension utilized to indicate the plurality of data packets used in parity generation, and may also contain valid Real-Time Transport Protocol sequence numbers.

The recovery module 320 coupled to the receiving interface 310 may first analyze the plurality of data packets from the receiving interface 310 to find out lost data packets by checking the sequence number. Next, the recovery module 320 may recover the lost data packets by executing exclusive OR between the corresponding plurality of data packets and the corresponding plurality of parity packets to get a plurality of recovery data packets. Then the recovery module 320 may send the plurality of recovery data packets and the plurality of data packets to the buffer 330 coupled to the recovery module 320.

The packet processor 340 coupled to the buffer 330 may merge the plurality of recovery data packets and the plurality of data packets into one single frame. For example, some video frames (especially the I-frames) may be larger than one packet, so the frames have to be split into multiple packets (called "packetization") in the outbound path of transmitters. In the inbound path of the receiver, such multiple packets have to be merged into one single frame to be decompressed. The media decoder 350 coupled to the packet processor 340 may be configured to decode the plurality of data packets and the plurality of recovery data packets to media data. The display interface 360 coupled to the media decoder 350 may be configured to output the media data.

Figure 4:
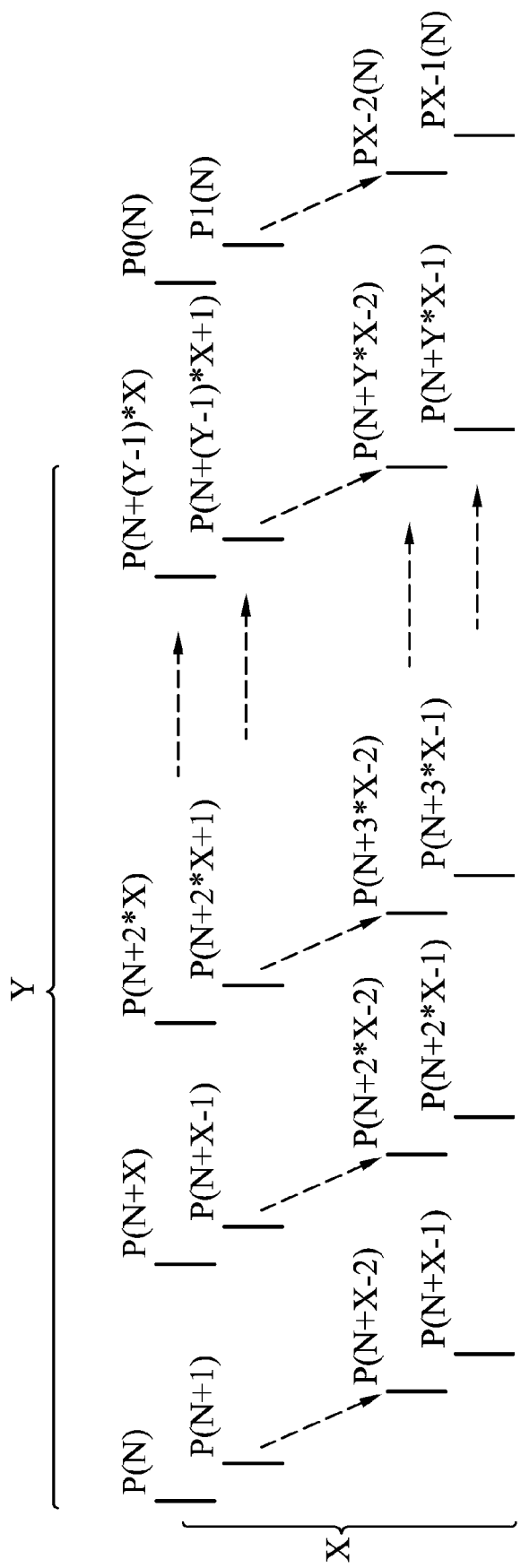
FIG. 4 is a scheme illustrating an exemplary method for selecting packets in an interleaved order for parity packets generation, according to one embodiment.

FIG. 4—Exemplary Interleaved Packets for Parity Packets Generation

FIG. 4 illustrates an exemplary method for selecting packets in an interleaved order for parity packets generation, according to one embodiment. As shown, P(N), P(N+1), ..., P(N+X−1), P(N+X), ..., P(N+Y*X−2), P(N+Y*X−1) may be data packets. N represents the sequence number of data packets. P0(N), P1(N), ... PX−2(N), PX−1(N) are the parity packets corresponding to data packet P(N). In this example, the number of data packets N is integral multiplicity of (X*Y) and the data packets may be selected to X sets in an interleaved order to generate X parity packets. In other words, there are (X*Y) data packets and X parity packets in a process batch, and each row of data packets may be the selected data packets for executing exclusive OR to generate a parity packet.

The parity packet generation equations are as follows:

$$P0(N)=P(N) XOR P(N+X) XOR P(N+2*X) XOR \ldots XOR P(N+(Y-1)*X)$$

$$P1(N)=P(N+1) XOR P(N+X+1) XOR P(N+2*X+1) XOR \ldots XOR P(N+(Y-1)*X+1)$$

$$PX-2(N)=P(N+X-2) XOR P(N+2*X-2) XOR P(N+3*X-2) XOR \ldots XOR P(N+Y*X-2)$$

$$PX-(N)=P(N+X-1) XOR P(N+2*X-1) XOR P(N+3*X-1) XOR \ldots XOR P(N+Y*X-1)$$

If there are data packets lost in communication, the lost data packets may be recovered by executing exclusive OR between the data packets and the parity data packet in the corresponding set. For example, if data packet P(N+X+1) is lost, it may be recovered by executing the following equation:

$$P(N+X+1)=P1(N) XOR P(N+1) XOR P(N+2*X+1) XOR \ldots XOR P(N+(Y-1)*X+1)$$

For the X-set interleave of Y+1 parity scheme described above, a lost data packet may be recovered up to a continuous loss of X data packets. Increasing the number of X will increase the protection of data packet loss. Besides, one parity data packet is generated for every Y number of data packets. As Y increases, the additional overhead of parity data packets decreases. For example, when Y=2, one parity data packet is generated for every two data packets (50%). When Y=3, one parity data packet is generated for every 3 data packets (33%). When Y=4, one parity data packet is generated for every 4 data packets (25%). In this embodiment, one parity data packet per set may protect the data packets up to one missing in the set. If more than one parity data packets are generated for each set, multiple packets can be recovered in a set.

Figure 5:
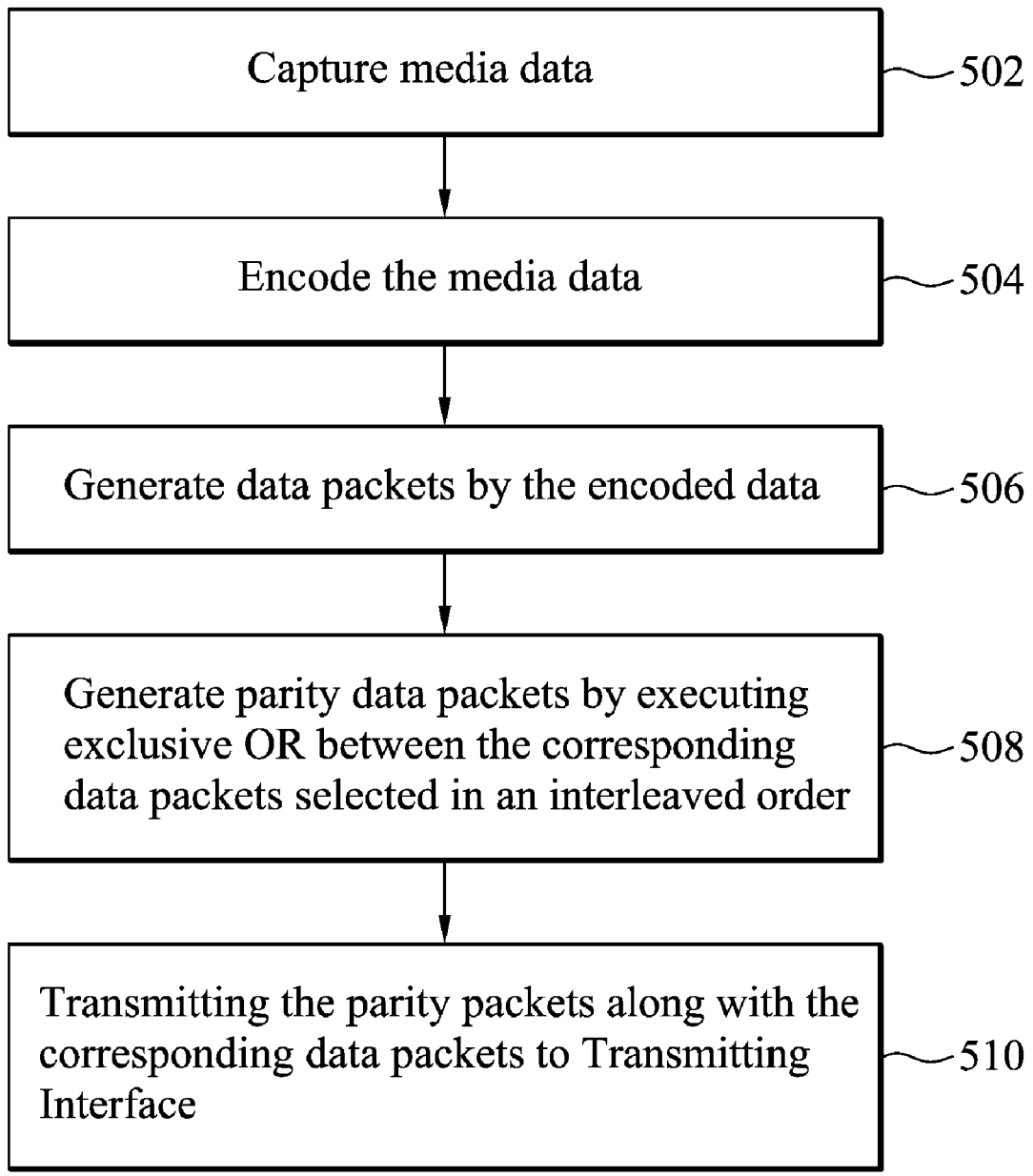
FIG. 5 is a flow chart illustrating an exemplary method for packet redundancy, according to one embodiment.

FIG. 5—Exemplary Method for Packet Redundancy

FIG. 5 illustrates an exemplary method for packet redundancy, according to one embodiment. The method shown in FIG. 5 may be used in conjunction with any of the communication systems or transmitters shown in the above Figures. In various embodiments, some of the method elements shown may be performed concurrently, performed in a different order than shown, or omitted. Additional method elements may also be performed as desired. As shown, this method may operate as follows.

In step 502, while receiving data, media data may be captured. In step 504, the media data may be encoded. In step 506, a plurality of data packets may be generated by the encoded data, wherein the plurality of data packets may contain header including sequence numbers based on the Real-Time Transport Protocol specifications.

In step 508, a largest data packet among the plurality of data packets may be selected, and the rest data packets of the plurality of data packets may be padded with a value (e.g., 0) to the same length of the largest packet. Then, a plurality of parity packets may be generated by executing exclusive OR between the corresponding plurality of data packets selected in an interleaved order, wherein the plurality of parity packets may contain header extension utilized to indicate the plurality of data packets used in parity generation. Besides, the plurality of parity packets may also contain valid Real-Time Transport Protocol sequence numbers.

In step 510, the plurality of parity packets may be transmitted along with the corresponding plurality of data packets to a communication receive.

Figure 6:
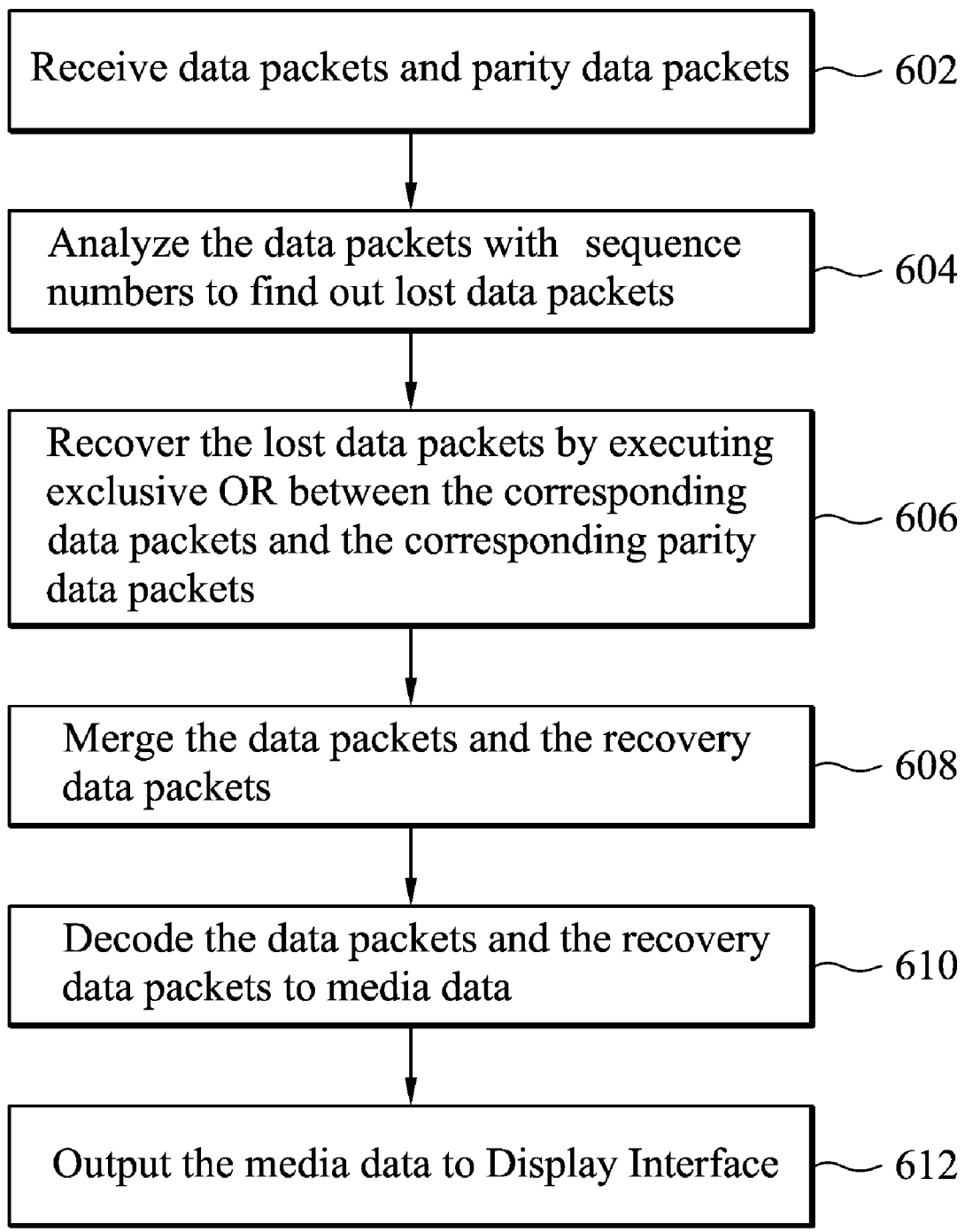
FIG. 6 is a flow chart illustrating an exemplary method for packet recovery, according to one embodiment.

FIG. 6—Exemplary Method for Packet Recovery

FIG. 6 illustrates an exemplary method for packet recovery, according to one embodiment. The method shown in FIG. 6 may be used in conjunction with any of the communication systems or transmitters shown in the above Figures. In various embodiments, some of the method elements shown may be performed concurrently, performed in a different order than shown, or omitted. Additional method elements may also be performed as desired. As shown, this method may operate as follows.

In step 602, a plurality of data packets and a plurality of parity data packets may be received, wherein the plurality of parity packets may be generated by executing exclusive OR between the corresponding plurality of data packets selected in an interleaved order. In one embodiment, the plurality of data packets are generated with header including sequence numbers based on the Real-Time Transport Protocol specifications. The plurality of parity packets may contain header extension utilized to indicate the plurality of data packets used in parity generation, and may contain valid Real-Time Transport Protocol sequence numbers.

In step 604, lost data packets may be found out by analyzing the sequence numbers of the plurality of data packets. In step 606, the lost data packets may be recovered by executing exclusive OR between the corresponding plurality of data packets and the corresponding plurality of parity packets. In step 608, the plurality of recovery data packets and the plurality of data packets may be merge into one single frame. In step 610, the plurality of data packets and the recovery data packets may be decoded to media data. In step 612, the media data may be output to display.

Advantages of the Method

A redundant packet is used to protect a group of data packets. The redundant packet carries sufficient information to re-create any one packet in the group should one of them is lost or damaged during the transmission. By combining multiple groups in a proper interleaving, burst loss of multiple packets can be protected also. The redundant packet is derived from the original data packets and is always sent along with the group, so there is no need to wait the time-out and re-transmission in case of loss or damage. This approach greatly enhances the reliability of an unreliable transmission channel, and reduces the time needed to send streaming data over bad network connections.

What is claimed is:

1. A communication transmitter, comprising:
a receiving interface configured to receive data having (X*Y) data packets;
a transmitting interface configured to transmit data to a communication receiver; and
a parity generator configured to:
generate X parity packets according to the (X*Y) data packets from the receiving interface, wherein an ith parity packet of the X parity packets are generated by executing exclusive OR (XOR) among the (X*Y) data packets by using the equation $$Pi(N)=P(N+i) \text{ XOR } P(N+X+i) \text{ XOR } P(N+2*X+i) \text{ XOR} \ldots \text{XOR} P(N+(Y-1)*X+i)$$

wherein N is the sequence number of data packets and is integral multiplicity of (X*Y), and i=0 ... X−1; and send the plurality of parity packets along with the corresponding plurality of data packets to a communication receiver via the transmitting interface, wherein the corresponding plurality of data packets executed exclusive OR are selected in an interleaved order.

2. The communication transmitter of claim 1, wherein the parity generator is further configured to do the followings prior to generate the parity packets:

select a largest data packet among the plurality of data packets; and pad the rest data packets of the plurality of data packets with a value to the same length of the largest packet.

3. The communication transmitter of claim 1, wherein the plurality of parity packets contain header extension utilized to indicate the plurality of data packets used in parity generation.

4. The communication transmitter of claim 1, wherein the parity generator comprises buffers to store the data packets and the parity packets.

5. The communication transmitter of claim 1, further comprising:

a media capture coupled to the receiving interface, wherein the media capture is configured to capture media data;

a media encoder coupled to the media capture, wherein the media encoder is configured to encode the media data; and a packet generation module coupled to the media encoder and the parity generator, wherein the packet generation module is configured to:

receive the encoded data from the media encoder;

generate the plurality of data packets; and send the plurality of data packets to the parity generator.

6. The communication transmitter of claim 5, wherein the plurality of data packets are generated with header including sequence numbers based on the Real-Time Transport Protocol specifications.

7. The communication transmitter of claim 5, wherein the packet generation module is integrated with the parity generator.

8. The communication transmitter of claim 7, wherein the plurality of parity packets contain valid Real-Time Transport Protocol sequence numbers if the packet generation module is integrated with the parity generator.

9. A communication receiver, comprising:

a receiving interface configured to receive (X*Y) data packets and X parity packets, wherein an ith parity packet of the X parity packets are generated by executing exclusive OR (XOR) among the (X*Y) data packets by using the equation $$Pi(N)=P(N+i) \text{ XOR } P(N+X+i) \text{ XOR } P(N+2*X+i) \text{ XOR} \ldots \text{XOR} P(N+(Y-1)*X+i)$$

wherein N is the sequence number of data packets and is integral multiplicity of (X*Y), and i=0, ..., X−1; and a recovery module coupled to the receiving interface, wherein the recovery module is configured to:

analyze the plurality of data packets with sequence numbers from the receiving interface to find out lost data packets;

recover the lost data packets by executing exclusive OR between the corresponding plurality of data packets and the corresponding plurality of parity packets to get a plurality of recovery data packets; and send out the plurality of recovery data packets and the plurality of data packets, wherein the corresponding plurality of data packets executed exclusive OR are selected in an interleaved order.

10. The communication receiver of claim 9, wherein the plurality of data packets are generated with header including sequence numbers based on the Real-Time Transport Protocol specifications.

11. The communication receiver of claim 9, wherein the plurality of parity packets contain header extension utilized to indicate the plurality of data packets used in parity generation.

12. The communication receiver of claim 9, wherein the plurality of parity packets contain valid Real-Time Transport Protocol sequence numbers.

13. The communication receiver in claim 9, further comprising:

a buffer coupled to the recovery module, wherein the buffer is configured to store the plurality of data packets and the plurality of recovery data packets from the recovery module;

a media decoder configured to decode the plurality of data packets and the plurality of recovery data packets to media data; and a display interface coupled to the media decoder, wherein the display interface is configured to output the media data to display.

14. The communication receiver in claim 9, further comprising a packet processor coupled to the buffer and the media decoder, wherein the packet processor is configured to merge the plurality of data packets and the plurality of recovery data packets into one single frame.

15. A packet redundancy method, comprising:

receiving (X*Y) data packets;

generating X parity packets according to the (X*Y) data packets, wherein an ith parity packet of the X parity packets are generated by executing exclusive OR (XOR) among the (X*Y) data packets by using the equation $$Pi(N)=P(N+i) \text{ XOR } P(N+X+i) \text{ XOR } P(N+2*X+i) \text{ XOR} \ldots \text{XOR} P(N+(Y-1)*X+i)$$

wherein N is the sequence number of data packets and is integral multiplicity of (X*Y), and i=0 ... X−1; and transmitting the plurality of parity packets along with the corresponding plurality of data packets to a communication receiver, wherein the corresponding plurality of data packets executed exclusive OR are selected in an interleaved order.

16. The packet redundancy method of claim 15, further comprising the following steps prior to generating the plurality of parity packets:

selecting a largest data packet among the plurality of data packets; and padding the rest data packets of the plurality of data packets with a value to the same length of the largest packet.

17. The packet redundancy method of claim 15, wherein the plurality of parity packets contain header extension utilized to indicate the plurality of data packets used in parity generation.

18. The packet redundancy method of claim 15, wherein the plurality of parity packets contain valid Real-Time Transport Protocol sequence numbers.

19. The packet redundancy method of claim 15, further comprising:
    capturing media data;
    encoding the media data; and
    generating the plurality of data packets by the encoded data.

20. The packet redundancy method of claim 19, wherein the plurality of data packets are generated with header including sequence numbers based on the Real-Time Transport Protocol specifications.

21. A packet recovery method, comprising:
    receiving (X*Y) data packets and X parity packets, wherein an ith parity packet of the X parity packets are generated by executing exclusive OR (XOR) among the (X*Y) data packets by using the equation $$Pi(N)=P(N+i) XOR P(N+X+i) XOR P(N+2*X+i) XOR \ldots XOR P(N+(Y-1)*X+i)$$

wherein N is the sequence number of data packets and is integral multiplicity of (X*Y), and i=0 ... X−1; and
    analyzing the plurality of data packets with sequence numbers to find out lost data packets; and
    recovering the lost data packets by executing exclusive OR between the corresponding plurality of data packets and the corresponding plurality of parity packets to get a plurality of recovery data packets,
    wherein the corresponding plurality of data packets executed exclusive OR are selected in an interleaved order.

22. The packet recovery method of claim 21, wherein the plurality of data packets are generated with header including sequence numbers based on the Real-Time Transport Protocol specifications.

23. The packet recovery method of claim 21, wherein the plurality of parity packets contain header extension utilized to indicate the plurality of data packets used in parity generation.

24. The packet recovery method of claim 21, wherein the plurality of parity packets contain valid Real-Time Transport Protocol sequence numbers.

25. The packet recovery method in claim 21, further comprising:
    merging the plurality of recovery data packets and the plurality of data packets;
    decoding the plurality of data packets and the plurality of recovery data packets to media data; and
    outputting the media data.

* * * * *